US008812651B1

(12) United States Patent
Eriksen et al.

(10) Patent No.: US 8,812,651 B1
(45) Date of Patent: Aug. 19, 2014

(54) SYSTEMS AND METHODS FOR CLIENT CACHE AWARENESS

(75) Inventors: Bjorn Marius Aamodt Eriksen, Mountain View, CA (US); Jeffrey Glen Rennie, Mountian View, CA (US); Othman Laraki, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 663 days.

(21) Appl. No.: 11/675,598

(22) Filed: Feb. 15, 2007

(51) Int. Cl.
*G06F 15/173* (2006.01)
*G06F 15/16* (2006.01)
*H04L 12/56* (2006.01)
*H04L 29/12* (2006.01)

(52) U.S. Cl.
CPC ........... *H04L 45/745* (2013.01); *H04L 2209/08* (2013.01); *H04L 2209/26* (2013.01); *H04L 29/12509* (2013.01)
USPC .......................................... 709/224; 709/232

(58) Field of Classification Search
CPC .............. H04L 45/745; H04L 2209/08; H04L 2209/26; H04L 29/12509; H04L 51/04; H04L 61/2567; H04L 63/0823; H04L 67/04; H04L 67/104; H04L 67/141; H04L 67/26; H04L 67/306; H04L 67/38; H04L 69/329
USPC ................................................. 709/203, 219
See application file for complete search history.

(56) References Cited

U.S. PATENT DOCUMENTS

| | | | |
|---|---|---|---|
| 4,953,106 A | 8/1990 | Gansner et al. | 364/521 |
| 5,450,535 A | 9/1995 | North | 395/140 |
| 5,559,984 A | 9/1996 | Nakano et al. | |
| 5,727,129 A | 3/1998 | Barrett et al. | 395/12 |
| 5,748,954 A | 5/1998 | Mauldin | 395/610 |
| 5,752,241 A | 5/1998 | Cohen | 707/3 |
| 5,802,292 A | 9/1998 | Mogul | 395/200.33 |
| 5,832,494 A | 11/1998 | Egger et al. | 707/102 |
| 5,835,905 A | 11/1998 | Pirolli et al. | 707/3 |
| 5,848,407 A | 12/1998 | Ishikawa et al. | 707/2 |
| 5,867,661 A * | 2/1999 | Bittinger et al. | 709/227 |
| 5,878,223 A | 3/1999 | Becker et al. | 395/200.53 |

(Continued)

FOREIGN PATENT DOCUMENTS

| | | |
|---|---|---|
| EP | 1182589 A2 | 2/2002 |
| GB | 2317723 A | 4/1998 |

(Continued)

OTHER PUBLICATIONS

Bruck, J., et al., "Weighted Bloom Filter," Information Theory, 2006 IEEE, Jul. 1, 2006 pp. 2304-2308.

(Continued)

*Primary Examiner* — Karen Tang
(74) *Attorney, Agent, or Firm* — Morgan, Lewis & Bockius LLP

(57) ABSTRACT

Before preloading a document to a client device, a server computer gets a client cache map associated with the client device. The client cache map has a matching entry for each document cached by the client device's cache. The server computer first checks if the document to be preloaded is already in the client device's cache by looking up the client cache map. If the document is cached, the server computer then checks whether the cached document's content is still fresh. As a result, the server computer preloads the document to the client device if the document is not cached or if the cached document's content is stale.

13 Claims, 10 Drawing Sheets

(56) References Cited

U.S. PATENT DOCUMENTS

| | | | |
|---|---|---|---|
| 5,946,697 A | 8/1999 | Shen | 707/104 |
| 5,978,791 A | 11/1999 | Farber et al. | 707/2 |
| 5,978,847 A | 11/1999 | Kisor et al. | 709/227 |
| 6,003,030 A | 12/1999 | Kenner et al. | 707/10 |
| 6,014,678 A | 1/2000 | Inoue et al. | 707/501 |
| 6,023,726 A | 2/2000 | Saksena | 709/219 |
| 6,029,175 A | 2/2000 | Chow et al. | 707/104 |
| 6,055,569 A | 4/2000 | O'Brien et al. | 709/223 |
| 6,067,565 A | 5/2000 | Horvitz | 709/218 |
| 6,085,193 A | 7/2000 | Malkin et al. | 707/10 |
| 6,085,226 A | 7/2000 | Horvitz | 709/203 |
| 6,088,707 A | 7/2000 | Bates et al. | 707/501 |
| 6,098,064 A * | 8/2000 | Pirolli et al. | 707/2 |
| 6,108,703 A | 8/2000 | Leighton et al. | 709/226 |
| 6,128,644 A | 10/2000 | Nozaki | 709/203 |
| 6,128,701 A | 10/2000 | Malcolm et al. | 711/133 |
| 6,134,551 A * | 10/2000 | Aucsmith | 1/1 |
| 6,134,583 A | 10/2000 | Herriot | 709/217 |
| 6,167,438 A | 12/2000 | Yates et al. | 709/216 |
| 6,170,013 B1 | 1/2001 | Murata | |
| 6,178,461 B1 | 1/2001 | Chan et al. | 709/247 |
| 6,182,122 B1 | 1/2001 | Berstis | 709/217 |
| 6,182,133 B1 | 1/2001 | Horvitz | 709/223 |
| 6,195,622 B1 * | 2/2001 | Altschuler et al. | 703/2 |
| 6,205,481 B1 | 3/2001 | Heddaya et al. | 709/226 |
| 6,230,168 B1 | 5/2001 | Unger et al. | 707/501 |
| 6,272,534 B1 | 8/2001 | Guha | 709/216 |
| 6,282,542 B1 | 8/2001 | Carneal et al. | 707/10 |
| 6,285,999 B1 | 9/2001 | Page | 707/5 |
| 6,292,880 B1 | 9/2001 | Mattis et al. | 711/216 |
| 6,317,777 B1 | 11/2001 | Skarbo et al. | 709/204 |
| 6,338,066 B1 | 1/2002 | Martin et al. | 707/10 |
| 6,341,311 B1 | 1/2002 | Smith et al. | |
| 6,405,252 B1 | 6/2002 | Gupta et al. | 709/224 |
| 6,421,726 B1 | 7/2002 | Kenner et al. | 709/225 |
| 6,442,549 B1 | 8/2002 | Schneider | |
| 6,484,143 B1 | 11/2002 | Swildens et al. | 705/1 |
| 6,493,702 B1 | 12/2002 | Adar et al. | 707/3 |
| 6,502,125 B1 | 12/2002 | Kenner et al. | 709/203 |
| 6,516,320 B1 | 2/2003 | Odom et al. | 707/101 |
| 6,526,479 B2 | 2/2003 | Rosenzweig | |
| 6,532,520 B1 | 3/2003 | Dean et al. | 711/133 |
| 6,542,964 B1 | 4/2003 | Scharber | |
| 6,553,411 B1 | 4/2003 | Dias et al. | 709/219 |
| 6,578,113 B2 | 6/2003 | Krishnamurthy et al. | 711/141 |
| 6,581,090 B1 | 6/2003 | Lindbo et al. | 709/217 |
| 6,584,498 B2 | 6/2003 | Nguyen | 709/219 |
| 6,611,908 B2 | 8/2003 | Lentz et al. | |
| 6,625,643 B1 | 9/2003 | Colby et al. | 709/217 |
| 6,631,451 B2 | 10/2003 | Glance et al. | 711/158 |
| 6,638,314 B1 | 10/2003 | Meyerzon et al. | 715/513 |
| 6,647,421 B1 | 11/2003 | Logue et al. | |
| 6,665,726 B1 | 12/2003 | Leighton et al. | 709/231 |
| 6,701,316 B1 | 3/2004 | Li et al. | |
| 6,725,214 B2 | 4/2004 | Garcia-Chiesa | |
| 6,742,033 B1 | 5/2004 | Smith et al. | 709/224 |
| 6,744,452 B1 | 6/2004 | McBrearty et al. | 345/853 |
| 6,745,295 B2 | 6/2004 | Rodriguez | |
| 6,757,733 B2 | 6/2004 | Gupta | 709/229 |
| 6,766,313 B1 | 7/2004 | Kromann | 707/2 |
| 6,766,352 B1 | 7/2004 | McBrearty et al. | 709/203 |
| 6,766,422 B2 | 7/2004 | Beyda | 711/137 |
| 6,772,225 B1 | 8/2004 | Jennings, III et al. | 709/240 |
| 6,782,393 B1 | 8/2004 | Balabanovic et al. | 707/104.1 |
| 6,813,690 B1 | 11/2004 | Lango et al. | 711/118 |
| 6,853,391 B2 | 2/2005 | Bates et al. | 345/854 |
| 6,883,135 B1 | 4/2005 | Obata et al. | 715/500 |
| 6,912,591 B2 | 6/2005 | Lash | 709/246 |
| 6,973,457 B1 | 12/2005 | Bastawala et al. | 707/10 |
| 7,003,566 B2 | 2/2006 | Codella et al. | 709/224 |
| 7,035,921 B1 | 4/2006 | Baker | 709/224 |
| 7,051,111 B1 | 5/2006 | Scullin | 709/232 |
| 7,095,949 B2 | 8/2006 | Okada | |
| 7,100,123 B1 | 8/2006 | Todd et al. | 715/862 |
| 7,130,872 B2 | 10/2006 | de Bonet | 707/203 |
| 7,130,890 B1 | 10/2006 | Kumar et al. | 709/218 |
| 7,155,475 B2 | 12/2006 | Agnoli et al. | |
| 7,185,001 B1 | 2/2007 | Burdick et al. | 707/3 |
| 7,228,350 B2 | 6/2007 | Hong et al. | |
| 7,249,053 B2 | 7/2007 | Wohlers et al. | 705/14 |
| 7,328,401 B2 | 2/2008 | Obata et al. | 715/501.1 |
| 7,343,397 B2 | 3/2008 | Kochanski | |
| 7,398,271 B1 | 7/2008 | Borkovsky et al. | 707/7 |
| 7,415,536 B2 | 8/2008 | Nakazawa | |
| 7,426,576 B1 | 9/2008 | Banga et al. | |
| 7,437,364 B1 | 10/2008 | Fredricksen et al. | 707/10 |
| 7,437,409 B2 * | 10/2008 | Danieli | 709/204 |
| 7,437,725 B1 | 10/2008 | Chang et al. | 718/100 |
| 7,461,155 B2 | 12/2008 | Reisman | 709/227 |
| 7,523,181 B2 | 4/2009 | Swildens et al. | |
| 7,548,908 B2 * | 6/2009 | Fu et al. | 1/1 |
| 7,565,425 B2 * | 7/2009 | Van Vleet et al. | 709/224 |
| 7,627,628 B2 | 12/2009 | King et al. | |
| 7,676,576 B1 | 3/2010 | Kommula | |
| 7,725,602 B2 | 5/2010 | Liu et al. | |
| 7,761,594 B1 | 7/2010 | Mowat | 709/238 |
| 7,836,044 B2 | 11/2010 | Kamvar et al. | |
| 8,010,670 B2 * | 8/2011 | Singh et al. | 709/226 |
| 2001/0020248 A1 | 9/2001 | Banga et al. | 709/219 |
| 2001/0033557 A1 | 10/2001 | Amalfitano | 370/335 |
| 2001/0050875 A1 | 12/2001 | Kahn et al. | |
| 2002/0002618 A1 | 1/2002 | Vange | 709/228 |
| 2002/0004813 A1 | 1/2002 | Agrawal et al. | |
| 2002/0007404 A1 | 1/2002 | Vange et al. | |
| 2002/0007413 A1 | 1/2002 | Garcia-Luna-Aceves et al. | |
| 2002/0016786 A1 | 2/2002 | Pitkow et al. | 707/3 |
| 2002/0023159 A1 | 2/2002 | Vange et al. | 709/228 |
| 2002/0031102 A1 | 3/2002 | Wiedeman et al. | |
| 2002/0048269 A1 | 4/2002 | Hong et al. | |
| 2002/0078087 A1 | 6/2002 | Stone | 707/511 |
| 2002/0078371 A1 | 6/2002 | Heilig et al. | 713/200 |
| 2002/0082811 A1 | 6/2002 | Honjas et al. | 703/2 |
| 2002/0097261 A1 | 7/2002 | Gottfurcht et al. | 345/738 |
| 2002/0107935 A1 | 8/2002 | Lowery et al. | 709/216 |
| 2002/0143892 A1 | 10/2002 | Mogul | 709/217 |
| 2002/0143984 A1 | 10/2002 | Hudson Michel | 709/238 |
| 2002/0156864 A1 | 10/2002 | Kniest | 709/217 |
| 2002/0156980 A1 | 10/2002 | Rodriguez | |
| 2002/0161860 A1 | 10/2002 | Godlin et al. | 709/219 |
| 2002/0184340 A1 | 12/2002 | Srivastava et al. | 709/219 |
| 2002/0188665 A1 | 12/2002 | Lash | 709/203 |
| 2002/0191610 A1 | 12/2002 | Baek et al. | 370/390 |
| 2002/0198883 A1 | 12/2002 | Nishizawa et al. | |
| 2002/0198961 A1 | 12/2002 | Krishnamurthy et al. | 709/217 |
| 2003/0005152 A1 | 1/2003 | Diwan et al. | 709/239 |
| 2003/0023813 A1 | 1/2003 | Malcolm | 711/119 |
| 2003/0046343 A1 | 3/2003 | Krishnamurthy et al. | 709/203 |
| 2003/0065743 A1 | 4/2003 | Jenny et al. | |
| 2003/0079027 A1 | 4/2003 | Slocombe et al. | 709/229 |
| 2003/0079041 A1 | 4/2003 | Parrella et al. | |
| 2003/0084159 A1 | 5/2003 | Blewett | 709/226 |
| 2003/0086098 A1 | 5/2003 | Sesek et al. | 358/1.1 |
| 2003/0101234 A1 | 5/2003 | McBrearty et al. | 709/218 |
| 2003/0158913 A1 | 8/2003 | Agnoli et al. | |
| 2003/0161611 A1 | 8/2003 | Okada | |
| 2003/0167257 A1 | 9/2003 | de Bonet | 707/1 |
| 2003/0172075 A1 | 9/2003 | Reisman | 707/10 |
| 2003/0172183 A1 | 9/2003 | Anderson et al. | |
| 2003/0212779 A1 | 11/2003 | Boyter et al. | 709/223 |
| 2003/0217173 A1 | 11/2003 | Butt et al. | 709/237 |
| 2004/0039798 A1 | 2/2004 | Hotz et al. | |
| 2004/0049598 A1 | 3/2004 | Tucker et al. | 709/246 |
| 2004/0064577 A1 | 4/2004 | Dahlin et al. | 709/235 |
| 2004/0073707 A1 | 4/2004 | Dillon | 709/245 |
| 2004/0078453 A1 | 4/2004 | Bhogal et al. | 709/219 |
| 2004/0078487 A1 | 4/2004 | Cernohous et al. | |
| 2004/0107296 A1 | 6/2004 | Donker et al. | 709/245 |
| 2004/0139282 A1 | 7/2004 | Yoshioka et al. | |
| 2004/0205149 A1 | 10/2004 | Dillon et al. | 709/217 |
| 2004/0205165 A1 | 10/2004 | Melamed et al. | |
| 2004/0215665 A1 | 10/2004 | Edgar et al. | |
| 2004/0225644 A1 | 11/2004 | Squillante et al. | 707/3 |
| 2004/0230747 A1 | 11/2004 | Ims et al. | 711/133 |
| 2004/0237044 A1 | 11/2004 | Travieso et al. | 715/530 |

(56) References Cited

U.S. PATENT DOCUMENTS

| | | | |
|---|---|---|---|
| 2004/0239681 A1 | 12/2004 | Robotham et al. | 345/581 |
| 2004/0249971 A1 | 12/2004 | Klinker | |
| 2004/0250119 A1 | 12/2004 | Shelest et al. | |
| 2004/0260466 A1 | 12/2004 | Ichihara et al. | |
| 2004/0262051 A1 | 12/2004 | Carro | 178/18.05 |
| 2005/0033803 A1* | 2/2005 | Vleet et al. | 709/203 |
| 2005/0038787 A1 | 2/2005 | Cheung et al. | 707/9 |
| 2005/0138176 A1* | 6/2005 | Singh et al. | 709/226 |
| 2005/0138604 A1 | 6/2005 | Harrison | 717/121 |
| 2005/0165778 A1 | 7/2005 | Obata et al. | 707/5 |
| 2005/0165829 A1 | 7/2005 | Varasano | 707/102 |
| 2005/0198224 A1 | 9/2005 | Kobayashi et al. | 709/220 |
| 2005/0198327 A1 | 9/2005 | Iwamura et al. | |
| 2005/0198386 A1 | 9/2005 | Accapadi et al. | |
| 2005/0204064 A1 | 9/2005 | Ruiz | |
| 2005/0246347 A1 | 11/2005 | Kobayashi | 707/10 |
| 2005/0278222 A1 | 12/2005 | Nortrup | 705/17 |
| 2005/0278417 A1 | 12/2005 | Fremantle et al. | 709/203 |
| 2006/0047804 A1* | 3/2006 | Fredricksen et al. | 709/224 |
| 2006/0085601 A1 | 4/2006 | Woffinden et al. | |
| 2006/0089978 A1 | 4/2006 | Lee et al. | 709/219 |
| 2006/0143568 A1 | 6/2006 | Milener et al. | 715/738 |
| 2006/0156387 A1* | 7/2006 | Eriksen | 726/3 |
| 2006/0167862 A1 | 7/2006 | Reisman | 707/3 |
| 2006/0168348 A1 | 7/2006 | Casalaina | 709/246 |
| 2006/0179123 A1 | 8/2006 | Smith | 709/218 |
| 2006/0253612 A1 | 11/2006 | Cheshire | |
| 2006/0271642 A1 | 11/2006 | Stavrakos et al. | |
| 2006/0294223 A1 | 12/2006 | Glasgow et al. | 709/224 |
| 2006/0294311 A1 | 12/2006 | Fu et al. | 711/118 |
| 2007/0022102 A1 | 1/2007 | Saxena | |
| 2007/0174774 A1 | 7/2007 | Lerman et al. | 715/723 |
| 2007/0189708 A1 | 8/2007 | Lerman et al. | 386/52 |
| 2007/0214052 A1 | 9/2007 | Kao | 705/15 |
| 2007/0250841 A1 | 10/2007 | Scahill et al. | 719/320 |
| 2007/0294480 A1 | 12/2007 | Moser | |
| 2008/0010365 A1 | 1/2008 | Schneider | |
| 2008/0140626 A1 | 6/2008 | Wilson | 707/3 |
| 2008/0195819 A1* | 8/2008 | Dumont | 711/138 |
| 2008/0222363 A1 | 9/2008 | Khemani et al. | |
| 2008/0229017 A1 | 9/2008 | Plamondon | |
| 2009/0049388 A1 | 2/2009 | Taib et al. | 715/738 |
| 2009/0119286 A1 | 5/2009 | Reisman | 707/5 |
| 2009/0276407 A1* | 11/2009 | Van Vleet et al. | 707/3 |
| 2010/0257236 A1 | 10/2010 | Agnoli et al. | |
| 2011/0125871 A1* | 5/2011 | Subramanian et al. | 709/218 |
| 2011/0264731 A1* | 10/2011 | Knowles et al. | 709/203 |
| 2012/0185565 A1* | 7/2012 | Subramanian et al. | 709/217 |

FOREIGN PATENT DOCUMENTS

| | | |
|---|---|---|
| WO | WO 01/55897 A1 | 8/2001 |
| WO | WO 02/100117 A1 | 12/2002 |
| WO | WO 2005/006129 | 1/2005 |

OTHER PUBLICATIONS

Gong, X., et al., "Bloom filter-based XML Packets Filtering for Millions of Path Queries," Proceedings of the 21st International Conference on Data Engineering (ICDE 2005), 12 pages.

International Search Report and Written Opinion for International Application No. PCT/US2008/054167, mailed Jul. 2, 2008.

International Search Report and Written Opinion for International Application No. PCT/US2008/088047, mailed Feb. 23, 2009.

Office Action dated Feb. 3, 2009 for related U.S. Appl. No. 11/675,601.

Office Action dated Feb. 25, 2009 for related U.S. Appl. No. 11/418,648.

Office Action dated Mar. 5, 2009, for related U.S. Appl. No. 11/418,649.

Bestavros, A., et al., "Server-initiated Document Dissemination for the WWW," *IEEE Data Engineering Bulletin*, 19(3):3-11, Sep. 1996, pp. 1-8.

Cao, P., et al., "A Study of Integrated Prefetching and Caching Strategies," *Proceeding of 1995 ACM SIGMETRICS*, Jun. 1995, pp. 171-182.

Curewitz, K.M., et al., "Practical Prefetching via Data Compression," *Proceedings of the 1993 ACM Conf. on Management of Data (SIGMOD)*, Washington DC, May 1993, pp. 257-266.

Fan, L., et al., "Web Prefetching Between Low-Bandwidth Clients and Proxies: Potential and Performance," *Proceedings of the ACM SIGMET-RICS Conf.*, May 1999, pp. 178-187.

Griffioen, J., et al., "Reducing File System Latency Using a Predictive Approach," *Proceedings of 1994 USENIX Summer Conf.*, Jun. 1994, pp. 197-207.

Gwertzman, J.S., et al., "The Case for Geographical Push-Caching," *Proceedings on the 1995 Workshop on Hot Operating Systems*, 1995, 5 pages.

Kimbrel, T., et al., "Integrated Parallel Prefetching and Caching," *Proceedings of the 1996 ACM SIGMETRICS Int'l Conf. on Measurement and Modeling of Computer Systems*, 1996, pp. 262-263.

Kroeger, T.M., et al., Digital's Web Proxy Traces, ftp://ftp.digital.com/pub/DEC/traces/proxy/webtraces.html, Dec. 1996.

Markatos, E.P., et al., "A Top-10 Approach to Prefetching on the Web," *Technical Report No. 173, ICS-Forth*, Heraklion, Crete, Greece, Aug. 1996, pp. 1-15.

Padmanabhan, V.N., et al., "Using Predictive Prefetching to Improve World Wide Web Latency," ACM SIGCOMM Computer Communication Review, Jul. 1996, 15 pages.

Palmer, M., et al., "Fido: A Cache That Learns to Fetch," *Proceedings of the 17th Int'l Conf. on Very Large Data Bases*, Barcelona, Spain, Sep. 1999, pp. 255-264.

Patterson, R.H., et al., "Informed Prefetching and Caching," *Proceedings of the 15th ACM Symposium on Operating Systems Principles*, Dec. 1995, pp. 79-95.

Schilit, B.N., et al., "TeleWeb: Loosely Connected Access to the World Wide Web," 5th Int'l World Wide Web Conference, Paris, France, May 6-10, 1996.

Tait, C.D., et al., "Detection and Exploitation of File Working Sets," *Proceedings of the 11th Int'l Conf. on Distributed Computing Systems*, May 1991, pp. 1-19.

Vitter, J.S., et al., "Optimal Prefetching via Data Compression," *Journal of the ACM*, vol. 43, Sep. 1996, pp. 771-793.

Williams, S., et al., "Removal Policies in Network Caches for World-Wide Web Documents," *Proceedings of ACM SIGCOMM '96 Conf.*, Aug. 1996, pp. 293-305.

Cohen, Proactive Caching of DNS Records: Addressing a Performance Bottleneck, SAINT, Jan. 2001, 10 pgs.

Arocena Gustavo O. et al., "Applications of a Web Query Language," *Computer Networks and ISDN Systems*; vol. 29, No. 8-13, Aug. 12, 1997, 15 pages.

Banga Gaurav et al., "Optimistic Deltas for WWW Latency Reduction," 1997 USENIX Technical Conference, pp. 1-15.

Botafogo Rodrigo A. et al., "Structural Analysis of Hypertext: Identifying Hierarchies and Userful Metrix," *ACM Transactions on Information Systems*, vol. 10, No. 2, Apr. 1992, pp. 142-180.

Boyle Craig et al., "To Link or not to link: An empirical comparison of hypertext linking strategies," *ACM SIGDOC' 92*; 1992; pp. 221-231.

Carriere Jeromy et al., "WebQuery: Searching and Visualizing the Web through Connectivity," *Proceedings of the 6th International World Wide Web Conference*; 1997; 14 pages.

Chan Mun Choon et al., "Cache-based Compaction: A New Technique for Optimizing Web Transfer," *IEEE*, 1999, 9 pages.

Craswell Nick et al., "Effective Site Finding using Link Anchor Information," *ACM 2001*, Sep. 2001, pp. 250-257.

Doreian Patrick, "A Measure of Standing for Citation Networks within a Wider Environment," *Information Processing and Management*, vol. 30, No. 1, 1994, pp. 21-31.

Doreian Patrick, "Measuring the Relative Standing of Disciplinary Journals," *Information Processing and Management*, vol. 24, No. 1, 1988, pp. 45-56.

Douglis Frederick et al., "Dynamic Suppression of Similarity in the Web: a Case for Deployable Detection Mechanisms," *IBM Research Report*, Jul. 2002, 8 pages.

(56) References Cited

OTHER PUBLICATIONS

Frisse Mark E., "Searching for Information in Hypertext Medical Handbook," *Communications of the ACM*, vol. 31, No. 7, Jul. 1998, pp. 880-886.

Garfield Eugene, "Citation Analysis as a Tool in Journal Evaluation," *Essays of an Information Scientist*, vol. 1, 1962-1973, pp. 527-544.

Geller Nancy L., "On the Citation Influence Methodology of Pinski and Narin," *Information Processing and Management*, vol. 14, 1978, pp. 93-95.

Henzinger Monika R. et al., "Measuring Index Quality Using Random Walks on the Web." *Proceedings of the 8th International World Wide Web Conference*, 1999, 35 pages.

Hubbell Charles H., "An Input-Output Approach to Clique Identification Sociometry," University of California Santa Barbara, 1965, pp. 377-399.

International Search Report, PCT/US2005/022067, Jan. 10, 2006, 7 pages.

Katz Leo, "A New Status Index Derived from Sociometric Analysis," *Psychometrika*, vol. 18, No. 1, 1953, pp. 39-43.

Kleinberg Jon M., "Authoritative Sources in a Hyperlinked Environment," *Journal of the ACM*, vol. 46, No. 1, Sep. 1999, pp. 604-632.

Luotonen Ari, "World-Wide Web Proxies," Apr. 1994, pp. 1-8.

Marchiori Massimo, "The Quest for Correct Information on the Web: Hyper Search Engines," 1997, 18 pages.

McBryan Oliver A, "GENVL and WWWW: Tools for Taming the Web," *Proceedings of the 1st International World Wide Web Conference*, May 1994; pp. 1-10.

Mizruchi Mark S et al., "Techniques for Disaggregating Centrality Scores in Social Networks," *Sociological Methodology*, 1996, pp. 26-48.

Mogul Jeffrey C. et al., "Delta Encoding in HTTP," *Network Working Group*, Jan. 2002, pp. 1-49.

Mogul Jeffrey C. et al., "Potential benefits of delta encoding and data compression for HTTP," ACM, 1997, pp. 181-194.

Pinski Gabriel et al., "Citation Influence for Journal Aggregates of Scientific Publications. Theory, with Application to the Literature of Physics," *Information Processing and Management*, vol. 12, No. 5-A, 1976; pp. 297-312.

Ramer Arthur, "Similarity, Probability and Database Organization," *IEEE*, 1996; pp. 272-276.

Rhea Sean C. et al., "Value-Based Web Caching," *Proceedings of the 12th International World Wide Web Conference*, May 2003, pp. 1-10.

Sakaguchi Tetsuo et al., "A Browsing Tool for Multi-lingual Documents for Users without Multi-lingual Fonts," *ACM*, 1996; pp. 63-71.

Wang Zheng et al., "Prefetching in World Wide Web," *IEEE*, 1996; pp. 28-32.

\* cited by examiner

SYSTEMS AND METHODS FOR CLIENT CACHE AWARENESS

RELATED APPLICATIONS

This application is related to U.S. patent application Ser. No. 10/882,792, "A System and Method of Accessing a Document Efficiently Through Multi-Tier Web Caching," filed on Jun. 30, 2004, which is hereby incorporated by reference in its entirety.

This application is also related to U.S. patent application Ser. No. 11/418,649, "Systems and Methods of Efficiently Preloading Documents to Client Devices," filed on May 5, 2006, which is hereby incorporated by reference in its entirety.

This application is also related to U.S. patent application Ser. No. 11/418,648, "Systems and Methods of Visually Representing Links Associated with Preloaded Content," filed on May 5, 2006, which is hereby incorporated by reference in its entirety.

FIELD

The present invention relates generally to the field of client-server computer network systems, and in particular, to systems and methods for client cache awareness.

BACKGROUND

In order to access a document (e.g., a webpage) on the Internet, a user must download the document from a web server to a client computer using a software application such as a web browser. Therefore, the document download speed is critical to the user's web browsing experience.

Multiple factors affect the document download speed. First, the bandwidth of the Internet network infrastructure is limited. Second, there are inherent inefficiencies with the hypertext transfer protocol (HTTP), the data transfer standard adopted by most web server providers and web browser developers. Third, many important recommendations published in the official HTTP protocol standard for improving document download speeds have not been implemented yet by manufacturers or developers or both.

Many proposals have been made to boost the document download speed at little or no extra cost. Among them, a client cache residing in the client computer in connection with a web browser is a popular choice. Documents such as static image files, frequently-visited webpages and the like, can be locally stored in a client cache (e.g., by storing them when the client first requests and downloads them, or by preloading them) so that the client's web browser does not have to download them from the document server or the website when it receives requests for any of the locally cached documents. From an on-line subscriber's perspective, client caching of frequently-visited documents and frequently-needed embedded content can reduce the average time required for rendering a document in the web browser.

There are certain issues with this approach. For instance, before uploading a document to the client cache, the document server or the website may not know in advance whether the document already resides in the client cache or not. Without such knowledge, the document server or the website may waste resources such as network bandwidth by preloading to the client cache a document for which an identical copy is already stored in the client cache.

It would therefore be desirable to provide systems and methods that address the problems identified above, and thereby improve the web browsing experience of many users.

SUMMARY

According to a first aspect of the present invention, before preloading a document to a client device, a server computer gets a client cache map associated with the client device. The client cache map has a matching entry for each document cached by the client device's cache. The server computer first checks if the document to be preloaded is already in the client device's cache by checking the client cache map. If the client cache map indicates that the document is cached, the server computer then checks whether the cached document's content is still fresh. As a result, the server computer preloads the document to the client device if the document is not cached or if the cached document's content is stale. In some embodiments, the client cache map includes a Bloom filter.

According to a second aspect of the present invention, a client device calculates a current false positive probability for a client cache map associated with the client device. Next, the client device compares the current false positive probability against a threshold, e.g., a target false positive probability. If the current false positive probability is higher than the target false positive probability, the client cache map is deemed as no longer valid. The client device, accordingly, re-generates the client cache map using documents currently cached by the client device. This re-generated client cache map is then sent to a server computer as a representation of the documents currently cached by the client device at predetermined moments. In some embodiments, the client cache map includes a Bloom filter.

According to a third aspect of the present invention, when a server computer is concerned with the authenticity of a client device, it queries the client device using a list of fingerprints, including test fingerprints that do not correspond to any document stored at the client device. If the query result associated with at least one test fingerprint is incorrect, the server computer denies the client device access to the server computer. Otherwise, if query results associated with both fingerprints of documents stored at the client device and the test fingerprints are correct, the server computer enables the client device to access the server computer. In some embodiments, the server computer verifies fingerprints of documents stored at the client device using a Bloom filter.

BRIEF DESCRIPTION OF THE DRAWINGS

For a better understanding of the nature and embodiments of the invention, reference should be made to the Description of Embodiments below, in conjunction with the following drawings in which like reference numerals refer to corresponding parts throughout the figures.

Like reference numerals refer to corresponding parts throughout the several views of the drawings.

DESCRIPTION OF EMBODIMENTS

Figure 1:
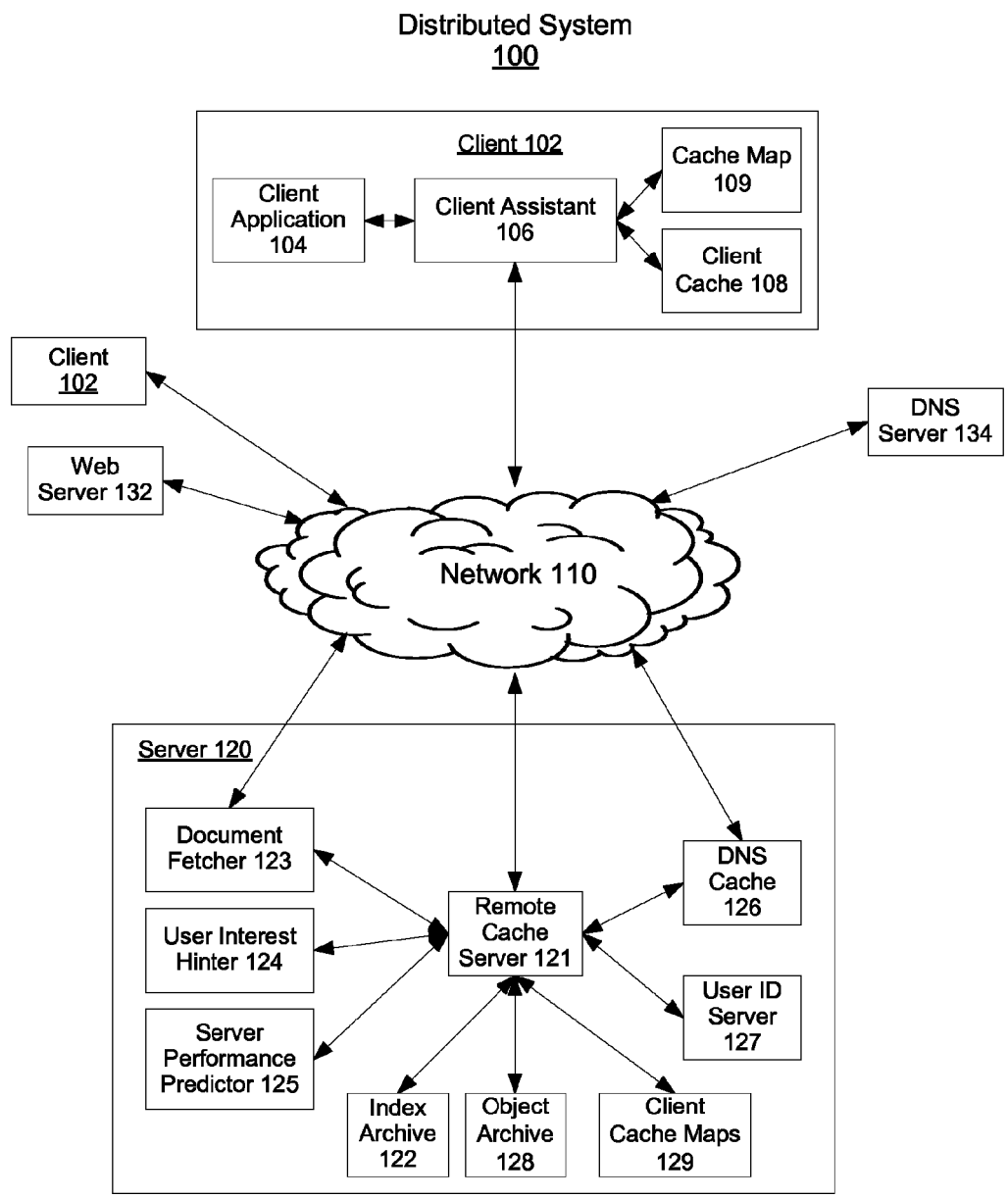
FIG. 1 is a block diagram illustrating the infrastructure of a client-server network environment according to some embodiments of the invention.

FIG. 1 is a block diagram illustrating the infrastructure of a client-server distributed system 100 according to some embodiments of the invention. The distributed system 100 includes a plurality of clients 102 and a document server 120. The internal structure of a client 102 includes a client application 104 (e.g., a web browser), a client assistant 106, a client cache 108, and a client cache map 109. The client cache map 109 has multiple entries, each entry corresponding to a document stored in the client cache. As described below, a copy of the client cache map is sent to the document server if there is a connection between the client and the document server. Based on the client cache map, the document server can easily determine whether a document to be uploaded is already present in the client cache or not. For example, the document server does not upload a document if an entry corresponding to the document is found in the client cache map and the content of the cached document is still fresh. Otherwise, the document is uploaded into the client cache and a new entry corresponding to the uploaded document is generated in the client cache map accordingly.

The client assistant 106 (or a respective client 102) has communication channels with the client application 104, the client cache 108, the client cache map 109, and a remote cache server 121 residing at the document server 120, respectively. The client assistant 106 and the remote cache server 121 are procedures or modules that facilitate the process of quickly serving a document download request by a user at the client 102. The client 102 (sometimes herein called the "client device" or "client computer") may be any computer or similar device that is capable of receiving documents from and sending requests including document links to the document server 120. Examples include, without limitation, desktop computers, notebook computers, tablet computers, and mobile devices such as mobile phones and personal digital assistants, and set-top boxes.

In this embodiment, the client application 104 has no associated cache or does not use its associated cache. Rather, the client application 104 directs all user requests to the client assistant 106. In some other embodiments, the client application 104 uses its own cache to store documents. Upon receiving a user request for a document, the client application 104 searches its own cache to satisfy the user request. If the cache does not have the user-requested document, i.e., there is a cache miss event, the client application 104 then forwards the user request to the client assistant 106 for further assistance. While the following discussion assumes, for illustrative purposes, that the client application 104 is a web browser, the client application can, in fact, be any software application that uses a document identified by a network address such as a URL (universal resource locator). Similarly, the term "URL" means a network address or location of this document. In this context, the term "document" means virtually any document or content of any format including, but not limited to, text, image, audio, video, etc., that may be used by a web browser or other application programs. An advantage of the arrangement shown in FIG. 1 is that the web browser and other application programs in the client 102 can share the same client cache 108 and cache map 109 and thereby avoid data duplication. But in another embodiment, the web browser 104 may use its own cache (not shown). Optionally, the client assistant 106 may synchronize the web browser's cache with the client cache 108 from time to time.

The document server 120 includes at least a remote cache server 121, an index archive 122, and an object archive 128. In some embodiments, the remote cache server 121, the index archive 122, and/or the object archive 128 are deployed over multiple computers to enable fast access to a large number of cached documents. For instance, the index archive 122 and the object archive 128 may be distributed over N servers, with a mapping function such as the "modulo N" function being used to determine which cached documents are stored in each of the N servers. N may be an integer greater than 1, e.g., an integer between 2 and 16,384. For convenience, the document server 120 is treated as though it were a single computer in this application. In reality, the document server 120, through its index archive 122 and object archive 128, manages a large number of documents that have been prefetched from various web hosts 132 over one or more communications networks 110 (e.g., the Internet, one or more other global networks, one or more local area networks, one or more metropolitan area networks, one or more wireless networks, or any combination thereof). The term "web host" refers to a source of documents (or more generally, a source of information) stored at network locations (e.g., URL's) associated with the web host. The term "web server" is sometimes used to mean the same thing as "web host." In some other embodiments, when the document server 120 does not have a user-requested document, the document server 120 directly fetches the user-requested document from a respective web host in response to a corresponding user request from a client 102 and then serves the fetched document to the requesting client.

In some embodiments, the document server 120 includes a document fetcher 123, a user interest hinter 124, a server performance predictor 125, a DNS cache 126, a user ID server 127, and client cache maps 129. These components may co-exist on a single computer or may be distributed over multiple computers. As described below, each component is responsible for one or more predefined tasks associated with serving documents to a requesting client or preloading documents to a client before the client requests any of them. The remote cache server 121 coordinates with these components to satisfy document download requests from different clients 102.

In some embodiments, the remote cache server 121 provides a set of network addresses (e.g., URLs) and IP addresses of the associated web hosts 132 to the document fetcher 123. The set of network addresses identifies documents to be downloaded from the web hosts 132. The DNS cache 126 is used for resolving the IP address of a web host 132. The address records in the DNS cache 126 are updated by a third-party DNS server 134 to make sure that any address record in the DNS cache 126 is presumptively fresh and may be used by the document fetcher 123 for downloading documents. If no address record is found in the DNS cache 126, the remote cache server 121 may query the DNS server 134 directly for the IP address associated with a web host 132.

After receiving the set of network addresses and IP addresses, the document fetcher 123 issues requests to the respective web hosts 132 to fetch the documents requested by the remote cache server 121. For each fetched document, the remote cache server 121 conducts a few further processing procedures including, e.g., generating relevant entries in the index archive 122 and the object archive 128 for the prefetched document, and parsing the document to determine what document links and objects (e.g., images) are embedded in the document. To ensure the freshness of the document contents in the document server 120, the remote cache server 121 updates entries in the index archive 122 and the object archive 128 according to a predefined schedule. When the content of a cached document is found to have changed, the update operation uses the document fetcher 123 to fetch a current version of the document from its web host 132.

Whenever the remote cache server 121 receives a user request for a document, it identifies the requested document in the index archive 122 and the object archive 128. The requested document is then returned to the requesting client 102. To better serve the user, the remote cache server 121 attempts to predict what subsequent documents the user would like to see after viewing the currently requested document. To get such information, the remote cache server 121 sends an inquiry to the user interest hinter 124. The inquiry may include the URL fingerprint of the document-being-requested and the identity of the requesting user provided by the user ID server 127. The user interest hinter 124 then returns a list of document names or URL fingerprints to the remote cache server 121. The document names identify or refer to candidate documents the requesting user is most likely to request next, or in the near future. Different mechanisms may be employed by the user interest hinter 124 in generating the list of candidate document names.

For each member in the list of candidate document names, the remote cache server 121 identifies the corresponding candidate document, if any, in the object archive 128. In some embodiments, the remote cache server 121 does not transmit the candidate documents to the requesting client until after transmitting the requested document. In some other embodiments, the candidate documents and the requested document may be transmitted to the client computer simultaneously. For example, in some embodiments there are multiple communication channels of different priorities between the remote cache server 121 and the client assistant 106. One or more communication channels of higher priorities are used for transmitting the requested document and other communication channels of lower priorities are used for transmitting (preloading) the candidate documents.

The server performance predictor 125 is used for predicting the performance of the document server 120. When a user requests a document from a client 102, the request can be met by either the document server 120 or a web host 132 that hosts the requested document. Depending on the configuration of the network 110 and the web host 132, there is no guarantee that the document server 120 will always serve the requested document faster than the web host 132. Sometimes, the document server 120 is more efficient than the web host 132. In other cases, serving the document from the web host 132 may be more efficient. To better serve the requesting user, the server performance predictor 125 may, periodically or episodically, compare the speeds of serving a document to a requesting client from a web host and the document server. The comparison result is provided to the client assistant 106 as a reference. If a particular web host outperforms the document server, the client assistant 106 will forward document requests to that web host whenever it receives a request for a document hosted by the web host. The comparison results are dynamically updated to reflect the dynamic nature of the network. If the client 102 is not sure which source (the document server or a web host) is more efficient in serving the document, it can consult the server performance predictor 125 for the identity of the source that is predicted to be the fastest or most efficient source of the document.

In some embodiments, there is a dedicated connection between the client assistant 106 and the remote cache server 121. This dedicated connection helps to reduce the communication latency between the client assistant 106 and the remote cache server 121. In one embodiment, the dedicated connection comprises at least one control stream and multiple data streams in each direction. These data streams serve as the communication channels between the remote cache server 121 and the client assistant 106. The remote cache server 121 uploads documents, including the requested document and the candidate documents, to the client assistant 106 using these data streams.

The control stream may be used to allow the client assistant 106 and the remote cache server 121 to exchange control information or alter the priorities of the data streams. For example, the remote cache server 121 initially transmits a candidate document to the client assistant 106 using a low priority data stream. After receiving an actual request for the candidate document, the remote cache server 121 can elevate the priority of the data stream using the control stream in order to serve the user request more promptly.

Figure 2A:
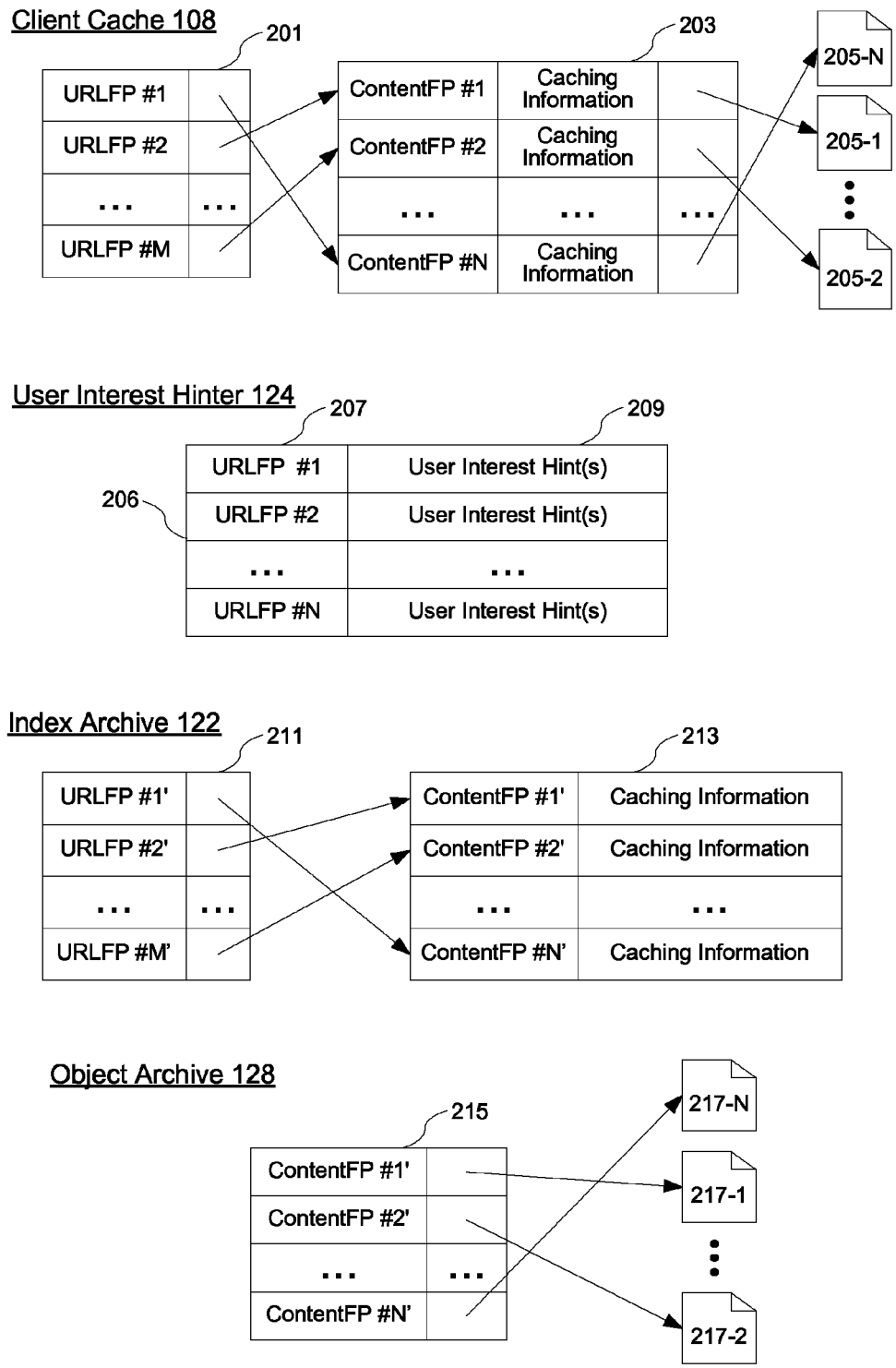
FIGS. 2A and 2B depict data structures associated with various components of the client-server network environment according to some embodiments of the invention.
Figure 2B:
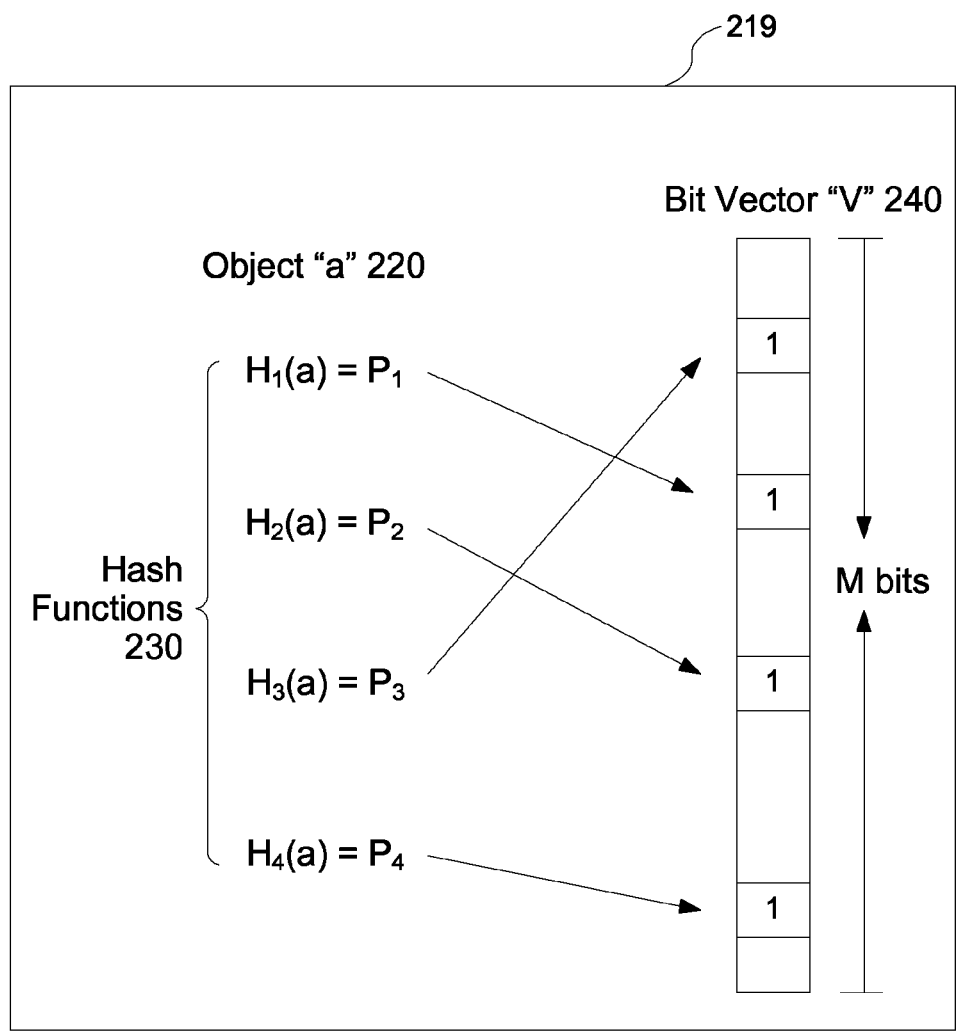

FIGS. 2A and 2B depict data structures associated with various components of the client-server distributed system 100 according to some embodiments of the invention. For instance, the client cache 108 (in client 102) includes a table 201 having a plurality of URL fingerprints. In some embodiments, a URL fingerprint is a 64-bit binary number (or a value of some other predetermined bit length) generated from the corresponding URL by first normalizing the URL text, e.g., by applying a predefined set of normalization rules to the URL text (e.g., converting web host names to lower case), and then applying a hash function to the normalized URL text to produce the 64-bit URL fingerprint. These URL fingerprints correspond to the documents stored in the client cache 108. Each entry in the URL fingerprint table 201 points to a unique entry in another table 203 that stores the content information of a plurality of documents. Each entry in the table 203 includes a unique content fingerprint (also known as content checksum), one or more content freshness parameters and a pointer to a copy of the corresponding document content 205. In one embodiment, some of the content freshness parameters are derived from the HTTP header of the document content 205. For example, the Date field in the HTTP header indicates when the document was downloaded to the client 102.

In the distributed system 100, the document server 120 serves as a proxy of multiple web hosts. It prefetches a large number of documents from many web hosts 132 and saves them in its index archive 122 and object archive 128. The index archive 122 maintains a mapping between a URL fingerprint in the URL fingerprint table 211 and a content fingerprint in the content fingerprint table 213. Each content fingerprint has associated caching information including, e.g., parameters indicating the freshness of the corresponding document content. In some embodiments, the set of freshness parameters includes an expiration date, a last modification date, and an entity tag, etc. The freshness parameters may also include one or more HTTP response header fields of a cached document. An entity tag is a unique string identifying one version of an entity, e.g., an HTML document, associated with a particular resource. The object archive 128 maps a content fingerprint in table 215 to a copy of the document content 217. In some embodiments, tables 211, 213 and 215 are small enough to reside in the main memory of one or more document servers. In other embodiments, the document contents 217 are stored in one or more secondary storage devices 220, e.g., one or more hard disk drives.

In some embodiments, as shown in FIG. 2B, the client cache map 109 takes the form of a Bloom filter 219. The Bloom filter 219 is a space-efficient probabilistic data structure used for detecting whether an object is a member of a set. It comprises multiple hash functions 230 (e.g., $H_1$, $H_2$, $H_3$, and $H_4$) and an M-bit vector 240. For each object "a" 220 in the set, the corresponding bits at positions $P_1$, $P_2$, $P_3$, and $P_4$ of the vector 240, which are determined by the respective hash functions $H_1$, $H_2$, $H_3$, and $H_4$, are set to 1. In some embodiments, the object is either a content fingerprint or a URL fingerprint of a document.

To check whether an object "b" is a member of the set, the hash functions 230 determine another four bit positions $H_1(b)$, $H_2(b)$, $H_3(b)$, and $H_4(b)$. If any of the bit positions stores 0, the object "b" is not in the set. Otherwise (i.e., if the values stored in all of the determined positions is equal to 1), it is assumed that the object "b" is in the set although there is a certain probability that the object "b" is not actually in the set, also known as "false positive". The "false positive" probability can be reduced by increasing the size M of the bit vector 240 and the number of hash functions 230. On the other hand, the "false positive" probability increases as more objects are added to the set.

In some embodiments, a client cache having a capacity of 1 GB can be represented by a 122 KB Bloom filter having four hash functions with a false positive probability of less than one percent. For instance, if the document server decides not to upload each of 100 documents to a client based on the document server's local copy of the client cache map, on average at least 99 of those decisions will be correct. When the document server makes an incorrect decision based on the client cache map, the primary consequence is that, in the event that the client 102 requires a document that was not uploaded by the document server, the client assistant 106 or client application 104 will need to retrieve the document from the document server 120 or from the document's associated web host 132. This may increase the waiting period for a user to view the document in the web browser.

Since the document server 120 often serves multiple clients at the same time, it keeps a copy of client cache map for each individual client in its client cache maps 129. In some embodiments, the client cache maps 129 take the form of a table 250. Each entry of the table 250 has at least three elements, including a client ID, an expiration timestamp (TS), and a client cache map (e.g., a Bloom filter). The client ID uniquely identifies a client connected to the document server 120. The expiration timestamp indicates the life expectancy of the client cache map. As noted above, when more objects are inserted into a set, the "false positive" probability of a Bloom filter increases. The expiration timestamp can be used to curb the "false positive" probability. For example, when an entry is generated in the table 250 for a client, an expiration timestamp is attached to the entry. The document server 120 invalidates or deletes a respective client cache map when the current time is equal to or later than the expiration timestamp of the respective client cache map.

In some other embodiments, the expiration timestamp is replaced by a counter that is used to count the number of objects inserted into the client cache map. When the number of objects reaches a predetermined threshold, the document server replaces it's copy of the client cache map in table 250 with a new copy of the client cache map obtained from the client associated with the client cache map (as identified by the client ID in table 250). Accordingly, the objects associated with the old client cache map, but not with the new client cache map, are eliminated from the document server 120. A new "false positive" probability can be determined for the new client cache map and inserted into the corresponding entry in the table client cache maps 129.

Figure 3:
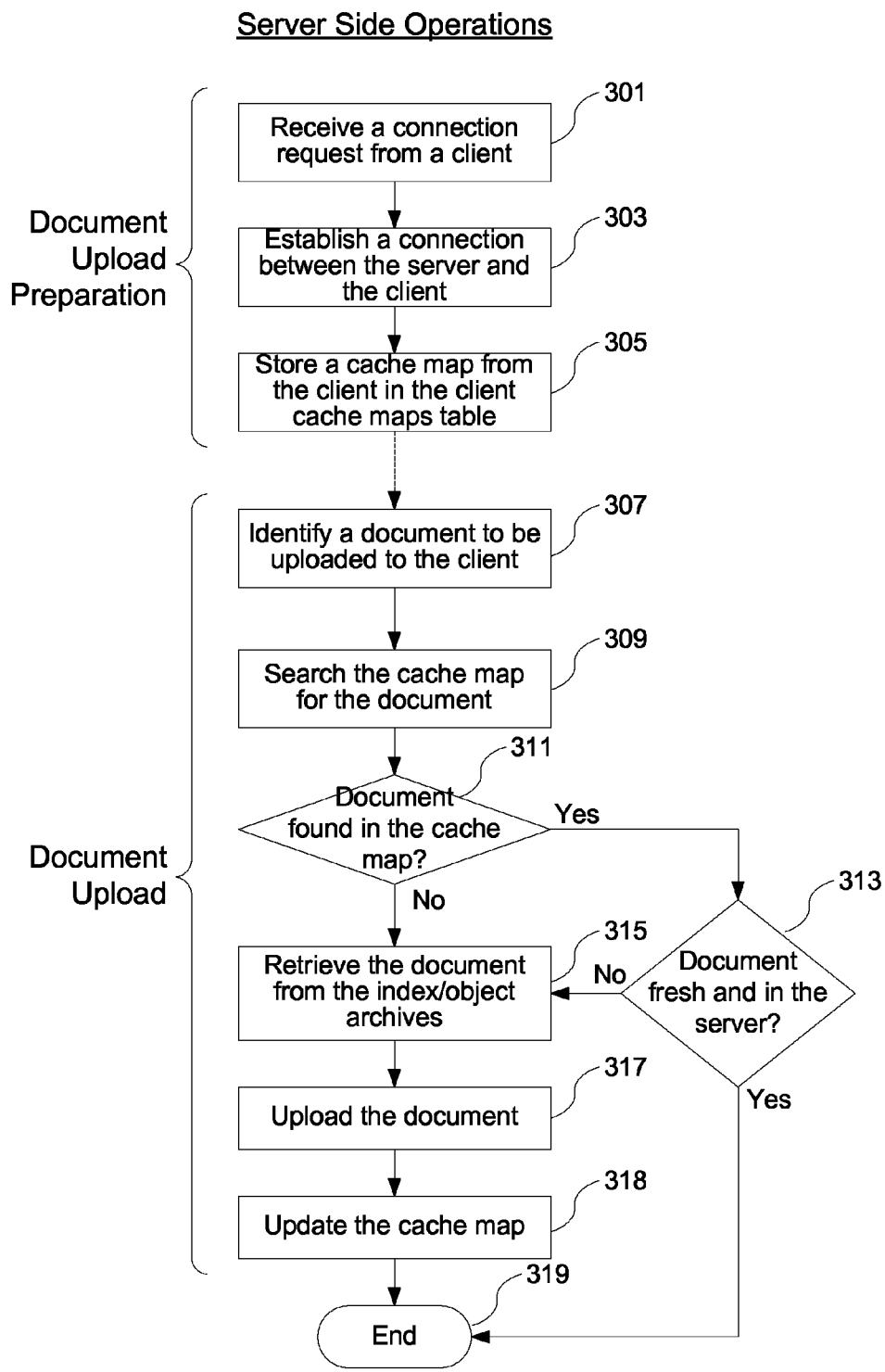
FIG. 3 is a flowchart illustrating a process of a document server checking the existence of a document in a client cache before uploading the document using a client cache map according to some embodiments of the invention.

FIG. 3 is a flowchart illustrating a process of a document server using a client cache map to determine if a document is already stored in a client cache before uploading the document to the client, according to some embodiments of the invention. As mentioned above in connection with FIG. 1, the client cache map 109 resides in the client 102. The content of the client cache map is kept in synch with the documents in the client cache 108. An addition of a new document to the client cache 108 triggers an update to the client cache map 109. For example, if the client cache map 109 is a Bloom filter, a set of bits corresponding to the new document is set (e.g., to 1). On the other hand, the Bloom filter is not updated when a document is removed from the client cache 108 because any bit of the Bloom filter may be associated with multiple documents.

Generally, the document server 120 does not keep track of documents in a client 102's client cache 108. Rather, the document server 120 receives a copy of the client cache map 109 from the client 102 through the connection between the client 102 and the document server 120. According to some embodiments, the client 102 scans the client cache 108 and generates a new client cache map corresponding to the documents currently in the client cache 108. The client cache map is transmitted to the document server 120, e.g., through a low-priority data stream. In some embodiments, this transmission occurs at the beginning of a new session between the client 102 and the document server 120. After receiving the client cache map (301), the document server 120 stores the map in its client cache maps 129, e.g., by generating a new entry in the table 250 (305). This completes the process of document upload preparation and the document server 120 is ready to upload documents to the client 102.

Subsequently, the document server 120 identifies a document to be uploaded to the client 102 (307). There are multiple reasons that a document server may decide to upload a document to a client. For example, the document server may receive a document download request submitted by a user at the client. In this case, the document server attempts to identify the requested document in its index archive and object archive. If the requested document is not found in the index archive and the object archive, the document server fetches the requested document from a web host. In some other embodiments, the document server may upload a document to a client even without a user request for the document. For instance, the document server may identify and preload a set of candidate documents based on tips generated by the user interest hinter.

But as noted above, a copy of the document to be uploaded, e.g., an old version of a web page identified by a URL, may already reside in the client cache. To avoid wasting resources, the document server first searches the corresponding client cache map for the document to be uploaded (309). There are two possible search results. First, the document has no matching entry in the client cache map (311, no). For example, at least one bit corresponding to the document in the Bloom filter is not set (e.g., equal to 0). In this case, the document is not in the client cache. Accordingly, the document server retrieves the identified document from the index and object archives (315).

In some embodiments, this retrieval further triggers the document fetcher 123 to download the document from a web host, e.g., if the document is not found in the archives or the copy in the archives are no longer servable. Next, the document server uploads the identified document to the client (317). In addition, the document server updates the client cache map (i.e., the local copy of the client cache map in the document server) to reflect the existence of the newly uploaded document in the client cache (318). Note that this update operation (318) may happen before, after or in parallel to the document upload operation (317).

The second possible search result is that an entry matching the document is found in the client cache map (311, yes). For example, all bits corresponding to the document in the Bloom filter are set (e.g., equal to 1). This indicates that there may be a copy of the document in the client cache. In one embodiment, the document server assumes that there is no need to upload another copy to the client even if the search result turns out to be a false positive. The consequences and resolution of a false positive are described above. If the client application 104 or the client assistant 106 subsequently find out that the document is not in the client cache 108 or, that the document is in the client cache 108 but the document's content is no longer fresh, a new document download request is submitted by the client to the document server or a web host for the current version of the requested document.

In some embodiments, when operation 307 occurs in response to the document server receiving a request for a document from a client, operations 309 and 311 are skipped, and the processing moves directly from 307 to 311. In these embodiments, the client cache map is searched by the document server only when performing document preloads.

In another embodiment (as shown in FIG. 3), the document server checks whether the document in the client cache is still fresh according to certain predefined criteria and whether it is also cached by the document server (313). A cached document whose content is deemed stale, e.g., for not meeting the predefined criteria, is not served to a requesting user. Rather, the document server retrieves a valid copy from its archives (315), preloads this one to the client (317), and updates the client cache map accordingly (318). In some cases, the document in the client cache may not exist in the document server's archives. For example, the document may have been directly downloaded by the client from a web host, circumventing the document server. In some embodiments, the document server is configured to assume that a document only found in the client cache (and not in the document server) is no longer valid. As a result, the document server gets the current version of the document from a web host through its document fetcher and then uploads the current version to the client.

Figure 4:
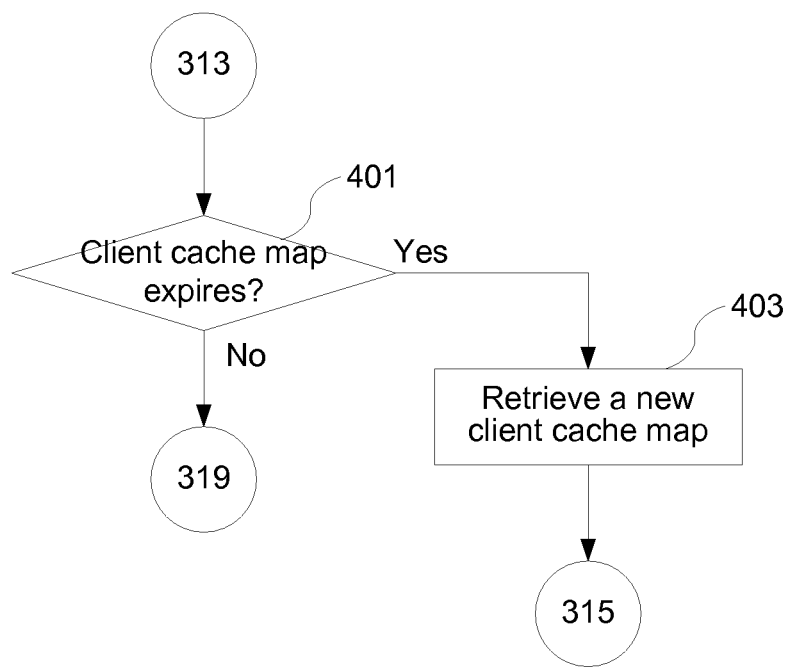
FIG. 4 is a flowchart illustrating a process of determining whether a client cache map has expired or not according to some embodiments of the invention.
Figure 5:
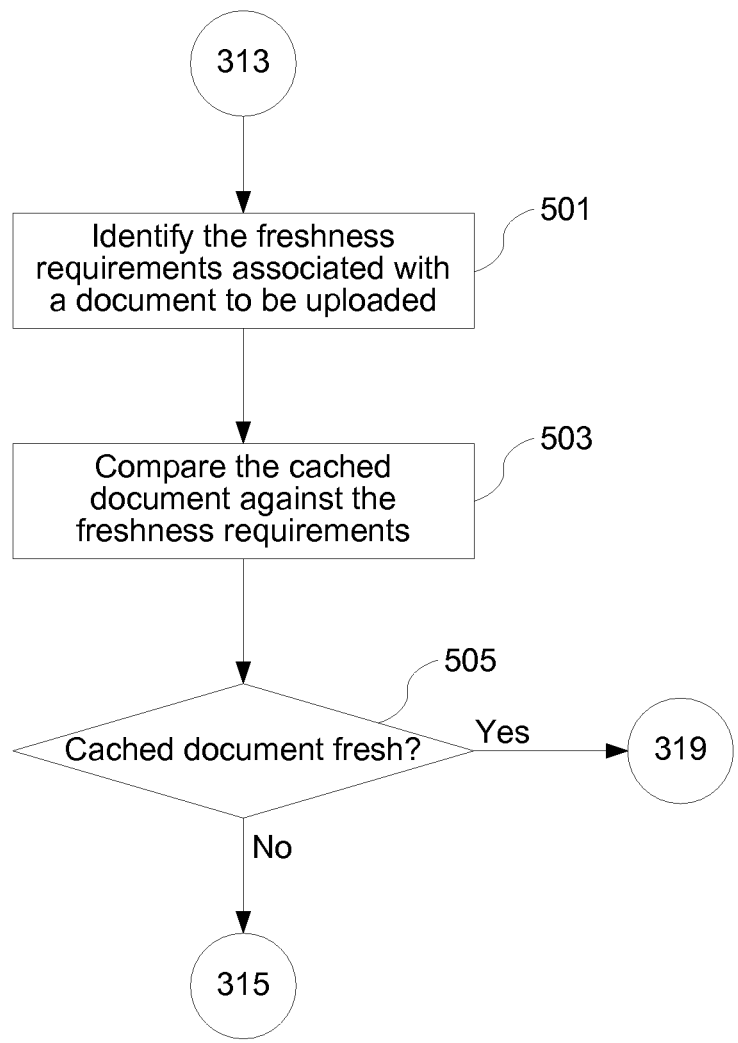
FIG. 5 is a flowchart illustrating a process of determining whether a document in the client cache is still fresh according to some embodiments of the invention.

FIGS. 4 and 5 further illustrate two exemplary processes of how to determine whether a document found in the client cache is fresh or not according to some embodiments of the present invention. As noted above, the client 102 generates a client cache map for its client cache 108 and sends the cache map to the document server 120 at the beginning of a new session. When generating the map, the client 102 may include in the map only those cached documents that will remain fresh for a predetermined period of time (e.g., two hours). In other words, the client 102 associates an expiration timestamp with the client cache map. Both the client cache map and the expiration timestamp are sent to the document server 120.

As shown in FIG. 4, before or after finding a match for a document to be uploaded in the client cache map, the document server 120 checks whether the client cache map has expired, based on its associated expiration timestamp. If the client cache map has expired (401, yes), all documents represented by the client cache map are deemed invalid. The document server requests and receives a new client cache map from the client 102. The new client cache map has an associated new expiration timestamp. Meanwhile, the document server looks up its own archives for the document to be uploaded (315). In some embodiments, the operations 403 and 315 are performed in parallel. While waiting for the new client cache map to arrive, the document server uploads any document associated with a particular client, be it a requested document or a candidate document. But if the client cache map has not expired (401, no), all documents represented by the client cache map are also deemed valid. In this case, the document server does not upload these documents to the client 102.

By assigning an expiration timestamp to the client cache map, the aforementioned approach treats all cached documents in a straightforward, uniform manner. In contrast, FIG. 5 depicts an approach that checks the freshness level of cached documents on an individual basis. To do so, the document server first identifies past download requests (e.g., HTTP requests) for a document by one or more clients.

In some embodiments, a download request includes a set of request headers. Some of the request headers specify a requesting client's requirement as to the freshness of a response, typically a requested document. For example, the "max-age" cache-control directive of the HTTP/1.1 standard indicates that the client is willing to accept a response whose age is no greater than the time in seconds specified by the "max-age" cache-control directive. Similarly, the "min-fresh" cache-control directive indicates that the client is willing to accept a response whose freshness lifetime is no less than its current age plus the time in seconds specified by the "min-fresh" cache-control directive. In other words, the client wants a response that will still be fresh for at least the specified number of seconds.

From analyzing the request headers of the past requests, the document server infers a set of freshness requirements for a document to be uploaded (501). The set of freshness requirements indicates the level of freshness required by the client. In one embodiment, the set of freshness requirements is comprised of the minimum values of the freshness-related headers in a download request. In another embodiment, the set of freshness requirements takes the average values of the freshness-related headers in a download request.

Next, the document server compares the document identified in the client cache map against the set of freshness requirements (503). For example, the document server applies the set of freshness requirements to the cached document. If the cached document meets all the freshness requirements (505, yes), it is presumed to be fresh and therefore there is no need to upload a new version of the document to the client 102. Otherwise, e.g., if at least one of the requirements is not met, the document server provides a new version of the document to the client 102.

In some embodiments, the set of freshness requirements includes a requirement as to the type of client application that renders the document. For example, the freshness requirements specify that the value of the HTTP request header "user-agent" be "Firefox." A cached document configured for display by the IE browser cannot be served in response to a request that specifies FireFox as the user-agent. This is because different web browsers may have different display requirements. A document that is configured for display (or rendering) by one type of web browser may not work for another one. One skilled in the art will appreciate that other requirements about the validity of a cached document can be implemented in a similar fashion.

As noted above, the client cache 108 has limited space (e.g., 1 GB). To make room for new documents, the client cache 108 implements a cache replacement policy, e.g., by randomly eliminating existing cache entries and/or retiring least-recently used cache entries at a predefined rate. Ideally, the removal of a document from the client cache 108 triggers a removal of a corresponding entry from the client cache map 109 to keep the two entities always in synch. But the Bloom filter does not support such a removal operation, because any bit in the Bloom filter may be mapped to multiple documents. Therefore, as time goes by, the Bloom filter-based cache map may include more and more outdated entries, whose associated documents have already been removed from the client cache. More outdated entries in the Bloom filter increases the false positive probability of the cache map. In some embodiments, a target false positive probability is established for the Bloom filter-based client cache map. When its false positive probability exceeds the target, the client cache map is re-generated to be in synch with the current document contents in the client cache.

The false positive probability of a Bloom filter can be defined as:

$$P_{false\_positive} \approx (1-e^{-kn/m})^k,$$

where k is the number of hash functions, n is the number of objects inserted into the Bloom filter, and m is the number of bits in the bit vector. The client or document server may select or generate an appropriate Bloom filter, with values of the three parameters k, n, and m that have been selected to meet a target false positive probability. For a fixed number of hash functions, a large cache (measured by the number of documents in the cache) requires a large bit vector to meet the target false positive probability and a small cache only needs a relatively small bit vector. The downside of a large bit vector is that it consumes more network bandwidth during transmission and also occupies more memory space in the document server. In some embodiments, the client 102 selects or generates a Bloom filter, from among a predefined set of Bloom Filters or a predefined range of Bloom filters, that has the smallest cache map size (m) that is consistent with a given target false positive probability, so as to minimize network bandwidth used for transmission of the cache map and to minimize memory space (in both the client and document server) used to store the cache map.

Figure 6:
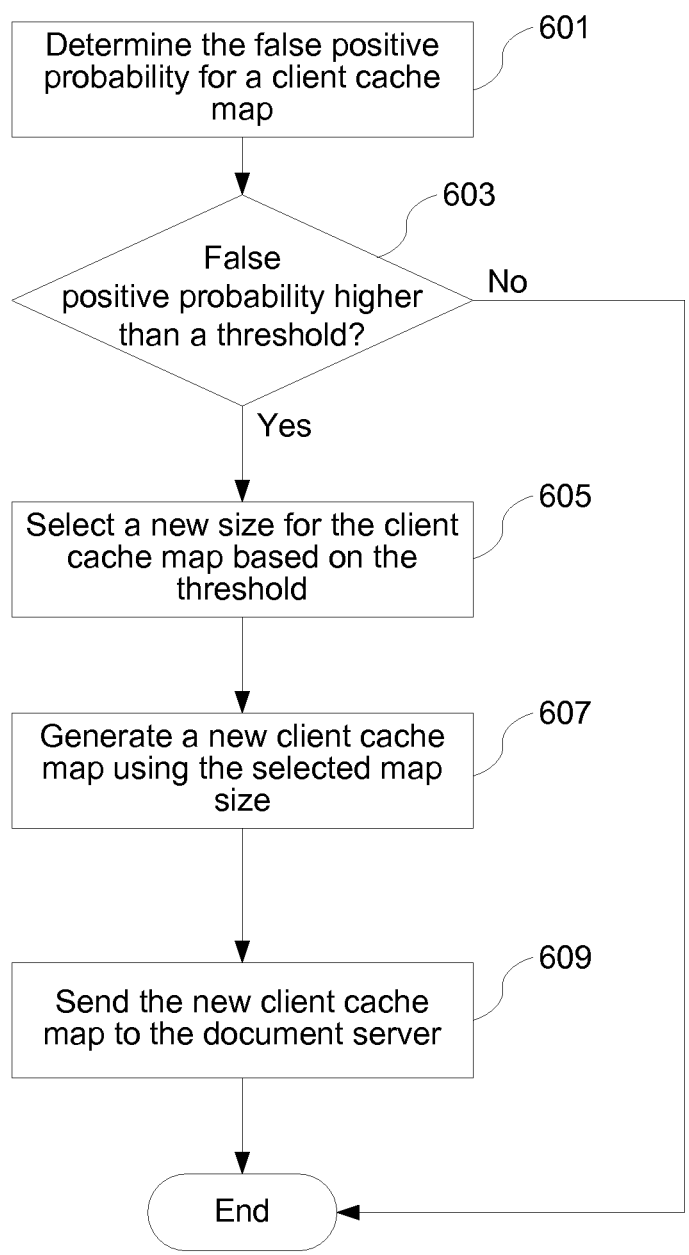
FIG. 6 is a flowchart illustrating a process of updating a client cache map according to some embodiments of the invention.

FIG. 6 is a flowchart illustrating a process of updating a client cache map according to some embodiments of the invention. According to a predetermined schedule, the client 102 determines the current false positive probability of its client cache map (601). By keeping track of the number of cache entries added to the client cache map 109, the client 102 can use the aforementioned formula to calculate the current false positive probability of the Bloom filter-based cache map. In some other embodiments, the number of cache entries inserted into the client cache map 109 and the number of cached objects in the client cache 108 are not always the same. The difference between these two numbers indicates the number of objects that have been evicted from the client cache 108. This difference value can be used to further adjust (e.g., increase) the false positive probability based on the aforementioned formula. Next, the current false positive probability is compared with a threshold, e.g., a target false positive probability. If the current false positive probability is lower than the target one (603, no), there is no need to update the client cache map and the process terminates.

If the current false positive probability is higher than the target one (603, yes), the client 102 determines a new vector size for the client cache map based on the threshold (605). This new vector size depends on the current client cache size and possibly also takes into account its growth rate. The size is selected such that the resultant cache map is predicted to be valid for a predetermined period of time (e.g., the duration of a typical session). Based on the newly selected vector size, the client 102 generates a new client cache map for the current client cache (607). Next, the new client cache map is sent to the document server to replace the old one (609). As noted above, the size of the client cache map may be selected to be as small as possible while still meeting the target false positive probability so as to minimize its associated computational cost (including transmission and storage). As mentioned above, the document server may request a new cache map from a client (see, e.g., the retrieve operation 403 of FIG. 4). The client cache map update process can be triggered by a request from the document server.

In some embodiments, the client cache map received by the document server is stored in the document server's memory for efficiency. The document server, periodically or not, eliminates those client cache maps associated with terminated network sessions from its memory so as to leave free space for hosting new client cache maps or for other purposes. If the document server temporarily runs out of memory space for a client cache map, it may inform the client to submit document download requests directly to various web hosts.

In other embodiments, the client 102 does not update its cache map 109 whenever a new document is inserted into the client cache 108. Instead, the client 102 re-generates the entire cache map when predefined conditions are met (e.g., decision 603 of FIG. 6). On the other hand, the document server 120 updates its own copy of the client cache map whenever a document is uploaded to the client 102. This is because the document server needs to query the cache map before uploading a document, whereas the client does not have this need.

Figure 7:
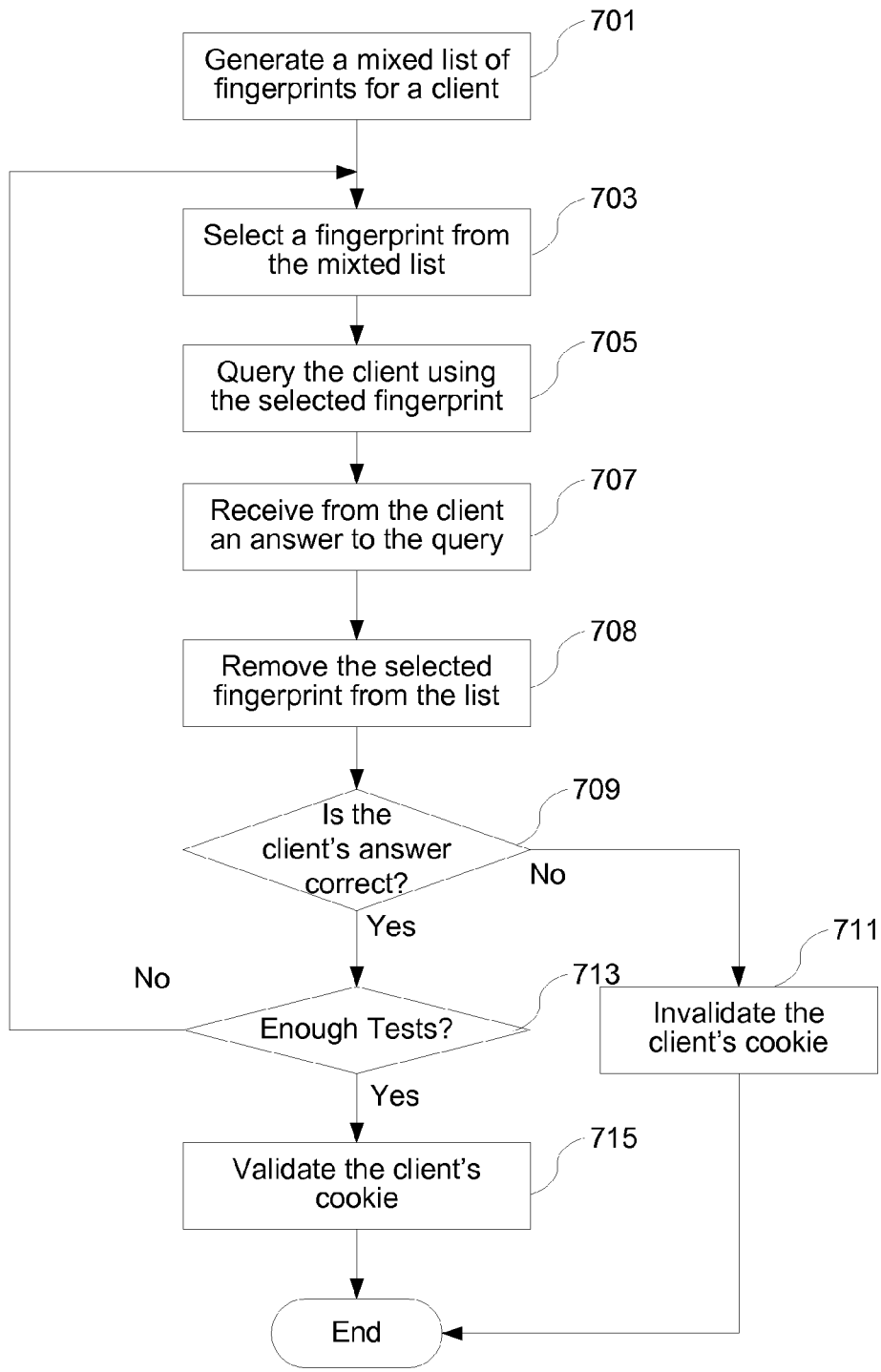
FIG. 7 is a flowchart illustrating a process of authenticating the identity of a client computer using its client cache map according to some embodiments of the invention.

Since the Bloom filter-based client cache map reflects the browsing activities by a particular client, it can be used as a tool for client authentication. FIG. 7 is a flowchart illustrating a process of the document server 120 authenticating the identity of a client using its client cache map according to some embodiments of the invention. Initially, the document server 120 generates a mixed list of fingerprints (e.g., URL and/or content fingerprints) for a client under authentication (701). In one embodiment, some members of the mixed list are fingerprints that corresponding to entries in the client cache map; these members of the mixed list are sometimes called valid fingerprints or first fingerprints. The other members of the mixed list are test fingerprints generated by the document server within the same fingerprint space (e.g., they have the same length or number of bits as the first fingerprints), but which do not correspond to any entries in the client cache map. In some embodiments, the test fingerprints are generated using a random or pseudo-random process or function.

Next, the document server selects a fingerprint from the list. The selected fingerprint may be a valid fingerprint or a test fingerprint (703). The document server then queries the client using the selected fingerprint (705) and receives an answer to the query (707). In some embodiments, the document server removes the selected fingerprint from the list to improve the reliability of the authentication result (708). Depending on the type of fingerprint, there are four possible answers:

|  | A match in the client cache | No match in the client cache |
| --- | --- | --- |
| Valid fingerprint | Correct answer | Maybe |
| Test fingerprint | Incorrect answer | Correct answer |

Note that if the selected fingerprint is a valid fingerprint, the client's answer indicating that it has no matching entry in the client cache is not necessarily an incorrect answer. This is because that the client may have retired the cache entry corresponding to the actual fingerprint according to its cache replacement policy. In practice, the document server may treat such an answer as a correct answer.

Referring again to FIG. 7, if the client's answer is incorrect (709, no), the document server assumes that the client is not the actual client associated with the client cache map held by the document server. Accordingly, the document server may invalidate the client cookie that the client has used to identify itself to the document server (711), thereby preventing the client from accessing the document server using the client cookie. To access the document server, the client will need to get a new client cookie, which will have a different client or user identifier than the invalidated client cookie. As a result, the client's access to the document server is restricted if the client incorrectly answers any of the fingerprint queries. Alternately, the client's access to the document server is blocked or denied if the client is unable to obtain a new client cookie.

On the other hand, even if the client's answer is correct this time (709, yes), there is no guarantee that the client communicating with the document server is the client corresponding to a respective client cache map stored by the document server. Rather, the document server checks if a sufficient number of tests have been conducted against the client. If not (713, no), the document server continues the authentication process by selecting another fingerprint in the list, and repeats the above described process until the client's authenticity is confirmed by enough tests. In this case, the document server validates the client's cookie (715) and the client is allowed to use the cookie to continue its communication with the document server.

Figure 8:
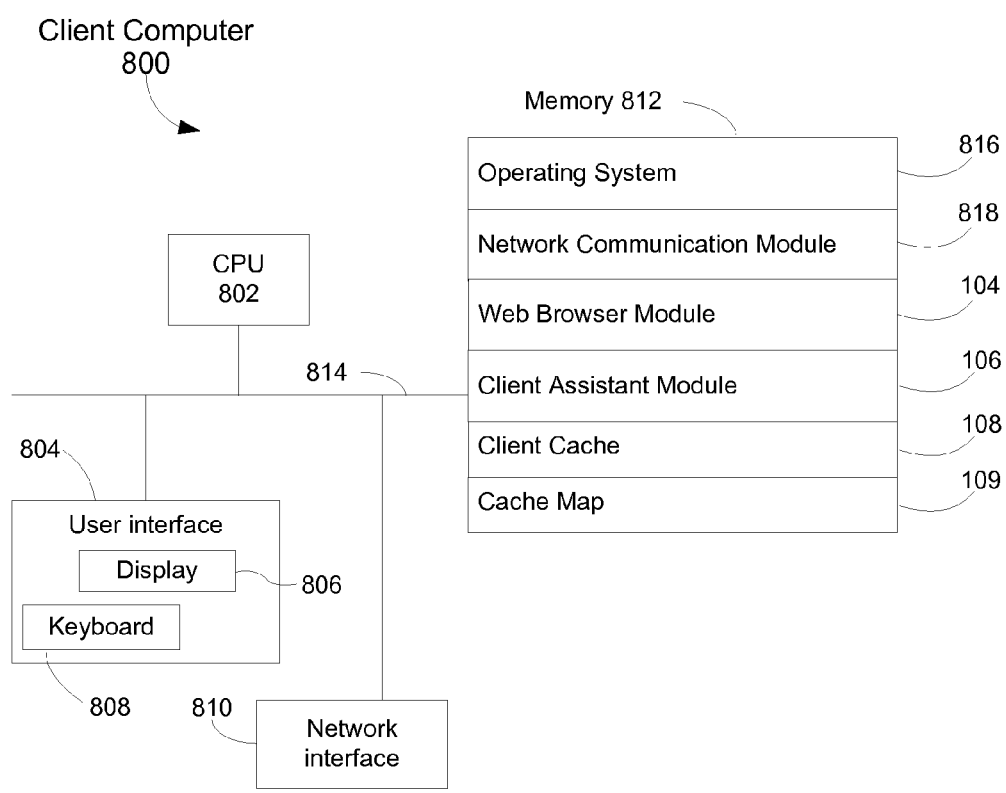
FIG. 8 is a block diagram of an exemplary client computer according to some embodiments of the invention.

FIG. 8 depicts a client computer 800 in accordance with some embodiments of the present invention, which typically includes one or more processing units (CPU's) 802, one or more network or other communications interfaces 810, memory 812, and one or more communication buses 814 for interconnecting these components. The communication buses 814 may include circuitry (sometimes called a chipset) that interconnects and controls communications between system components. The client computer 800 may also include a user interface 804 comprising a display device 806 and a keyboard 808. Memory 812 may include high speed random access memory and may also include non-volatile memory, such as one or more magnetic disk storage devices. Memory 812, or one or more of the storage devices (e.g., one or more non-volatile storage devices) in memory 812, includes a computer readable storage medium. Memory 812 or the computer readable storage medium of memory 812 preferably stores the following programs, modules and data structures, or a subset or superset thereof:

- an operating system 816 that includes procedures for handling various basic system services and for performing hardware dependent tasks;
- a network communication module (or instructions) 818 that is used for connecting the client computer 800 to other computers via the one or more communication network interfaces 810 and one or more communication networks, such as the Internet, other wide area networks, local area networks, metropolitan area networks, and the like;
- an application (or instructions) 104, such as a web browser application, for receiving a user request for a document and rendering the requested document on a computer monitor or other user interface device;
- a client assistant module (or instructions) 106, as described elsewhere in this document;
- a client cache 108 for storing user-requested documents and preloaded documents; and
- a client cache map 109 for representing the contents of the client cache 108 and used by the document server in choosing documents to be uploaded to the client computer.

Figure 9:
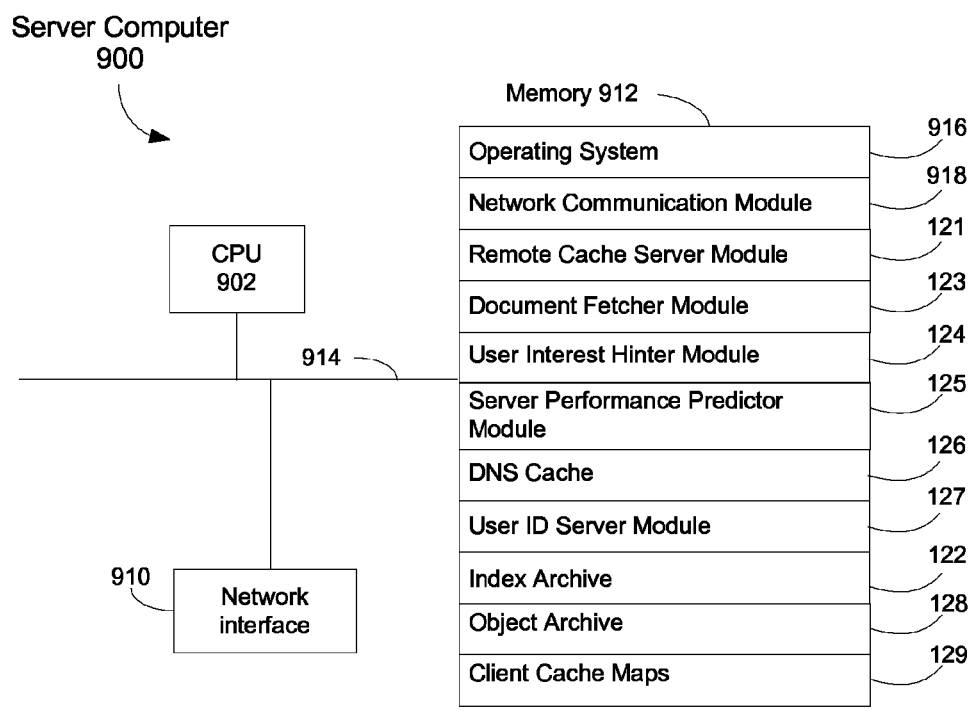
FIG. 9 is a block diagram of an exemplary server computer according to some embodiments of the invention.

FIG. 9 depicts a server computer 900 (e.g., a document server 120) in accordance with one embodiment of the present invention, which typically includes one or more processing units (CPU's) 902, one or more network or other communications interfaces 910, memory 912, and one or more communication buses 914 for interconnecting these components. The communication buses 914 may include circuitry (sometimes called a chipset) that interconnects and controls communications between system components. The server computer 900 may optionally include a user interface 904 comprising a display device 906 and a keyboard 908. Memory 912 may include high speed random access memory and may also include non-volatile memory, such as one or more magnetic disk storage devices. Memory 912 preferably stores the following programs, modules and data structures, or a subset or superset thereof:

- an operating system 916 that includes procedures for handling various basic system services and for performing hardware dependent tasks;
- a network communication module (or instructions) 918 that is used for connecting the server computer 900 to other computers via the one or more communication network interfaces 910 and one or more communication networks, such as the Internet, other wide area networks, local area networks, metropolitan area networks, and the like;
- a remote cache server module (or instructions) 121 for receiving a document retrieval request from a client assistant and transferring the requested document and candidate documents to the client assistant 106;
- a document fetcher module (or instructions) 123 for retrieving documents from different web servers;
- a user interest hinter module (or instructions) 124 for predicting a user's browsing interest based on various types of user activities including the mouse cursor movements and the usage statistics as well as the layouts of the documents retrieved from different web servers;
- a server performance predictor module (or instructions) 124 for comparing the speeds of serving a document to a requesting client computer from a web server and the server computer;
- a DNS cache 126 for storing records that map the hostnames of the web servers to their respective IP addresses;
- a user ID server module (or instructions) 127 for storing records of the users using the server computer;
- an index archive 122 for storing a plurality of document identity records; in an exemplary embodiment each record includes a document's URL fingerprint, a document content fingerprint and document content freshness parameters;

an object archive 128 for managing a plurality of documents; in an exemplary embodiment, each record includes a document's content fingerprint and a copy of the document content; and client cache maps 129 for storing the client cache maps of clients that have an active network session with the server computer.

Although FIG. 9 shows a "server," FIG. 9 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 9 could be implemented on single servers and single items could be implemented by one or more servers. The actual number of servers used to implement a website server and how features are allocated among them will vary from one implementation to another, and may depend in part on the amount of data traffic that the system must handle during peak usage periods as well as during average usage periods.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A computer-implemented method, comprising:
at a server computer having one or more processors and memory storing one or more programs:
receiving a client cache map from a client device, wherein the client cache map received from the client device comprises a Bloom filter and contains information corresponding to documents cached at the client device; and
without receiving from the client device a user request for a document:
identifying a document as a candidate document for preloading to the client device;
determining, in accordance with the client cache map, whether the document is cached by the client device;
conditionally, in accordance with a determination that the document is not cached by the client device, preloading the document to the client device and updating the Bloom filter of the client cache map to reflect the document preloaded to the client device;
conditionally, in accordance with a determination that the document is cached by the client device, determining whether the cached document's content is stale; and
conditionally, in accordance with a determination that the document is stale, preloading the document to the client device.

2. The method of claim 1, wherein the document is identified as a candidate document for preloading if user browsing activities at the client device meet predefined criteria.

3. The method of claim 1, wherein determining whether the document is cached by the client device further comprises:
identifying the document as cached if the client cache map has an entry matching the document; and
identifying the document as not cached if the client cache map has no entry matching the document.

4. The method of claim 1, wherein conditionally determining whether the cached document's content is stale comprises:
identifying the cached document as fresh if the client cache map has not expired; and
identifying the cached document as stale if the client cache map has expired.

5. The method of claim 1, wherein conditionally determining whether the cached document's content is stale comprises:
identifying the cached document as fresh if the cached document meets each of a set of freshness requirements; and
identifying the cached document as stale if the cached document fails any of the set of freshness requirements.

6. A system for preloading documents to a client device, comprising:
at least one processor; and
memory storing at least one program for execution by the at least one processor, the at least one program including:
instructions for receiving a client cache map from the client device, wherein the client cache map received from the client device comprises a Bloom filter and contains information corresponding to documents cached at the client device;
preloading instructions, for execution without receiving from the client device a user request for a document, the preloading instructions including:
instructions for identifying a document as a candidate document for preloading to the client device;
instructions for determining, in accordance with the client cache map, whether the document is cached by the client device;
instructions for conditionally, in accordance with a determination that the document is not cached by the client device, preloading the document to the client device and updating the Bloom filter of the client cache map to reflect the document preloaded to the client device;
instructions for conditionally, in accordance with a determination that the document is cached by the client device, determining whether the cached document's content is stale; and
instructions for conditionally, in accordance with a determination that the document is stale, preloading the document to the client device.

7. The system of claim 6, wherein the instructions for determining whether the document is cached by the client device further comprise:
instructions for identifying the document as cached if the client cache map has an entry matching the document; and
instructions for identifying the document as not cached if the client cache map has no entry matching the document.

8. The system of claim 6, wherein the instructions for conditionally determining whether a cached document's content is stale further comprise:
instructions for identifying the cached document as fresh if the client cache map has not expired; and
instructions for identifying the cached document as stale if the client cache map has expired.

9. The system of claim 6, wherein the instructions for conditionally determining whether a cached document's content is stale further comprise:
 instructions for identifying the cached document as fresh if the cached document meets each of a set of freshness requirements; and
 instructions for identifying the cached document as stale if the cached document fails any of the set of freshness requirements.

10. A non-transitory computer readable storage medium storing at least one program for execution by at least one processor of a computer system, the at least one program including:
 instructions for receiving a client cache map from a client device, wherein the client cache map received from the client device comprises a Bloom filter and contains information corresponding to documents cached at the client device;
 preloading instructions, for execution without receiving from the client device a user request for a document, the preloading instructions including:
  instructions for identifying a document as a candidate document for preloading to the client device;
  instructions for determining, in accordance with the client cache map, whether the document is cached by the client device;
  instructions for conditionally, in accordance with a determination that the document is not cached by the client device, preloading the document to the client device and updating the Bloom filter of the client cache map to reflect the document preloaded to the client device;
  instructions for conditionally, in accordance with a determination that the document is cached by the client device, determining whether the cached document's content is stale; and
  instructions for conditionally, in accordance with a determination that the document is determined to be stale, preloading the document to the client device.

11. The computer readable storage medium of claim 10, wherein the instructions for determining whether the document is cached by the client device further comprise:
 instructions for identifying the document as cached if the client cache map has an entry matching the document; and
 instructions for identifying the document as not cached if the client cache map has no entry matching the document.

12. The computer readable storage medium of claim 10, wherein the instructions for conditionally determining whether a cached document's content is stale further comprise:
 instructions for identifying the cached document as fresh if the client cache map has not expired; and
 instructions for identifying the cached document as stale if the client cache map has expired.

13. The computer readable storage medium of claim 10, wherein the instructions for conditionally determining whether a cached document's content is stale further comprise:
 instructions for identifying the cached document as fresh if the cached document meets each of a set of freshness requirements; and
 instructions for identifying the cached document as stale if the cached document fails any of the set of freshness requirements.

\* \* \* \* \*